US009391704B2

(12) United States Patent
Gerstel et al.

(10) Patent No.: US 9,391,704 B2
(45) Date of Patent: Jul. 12, 2016

(54) REPLACING AN EXISTING NETWORK COMMUNICATIONS PATH WITH A NEW PATH USING SOME EXCLUSIVE PHYSICAL RESOURCES OF THE EXISTING PATH

(71) Applicants: Ornan Alexander Gerstel, Herzelia (IL); Zafar Ali, Hicksville, NY (US); Clarence Filsfils, Brussels (BE); George Leonard Swallow, Boston, MA (US); Matthew Hartley, Ottawa (CA)

(72) Inventors: Ornan Alexander Gerstel, Herzelia (IL); Zafar Ali, Hicksville, NY (US); Clarence Filsfils, Brussels (BE); George Leonard Swallow, Boston, MA (US); Matthew Hartley, Ottawa (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/769,355

(22) Filed: Feb. 17, 2013

(65) Prior Publication Data
US 2014/0233946 A1   Aug. 21, 2014

(51) Int. Cl.
| H04B 10/27 | (2013.01) |
| H04L 12/729 | (2013.01) |
| H04L 12/721 | (2013.01) |
| H04L 12/707 | (2013.01) |
| H04L 12/717 | (2013.01) |

(52) U.S. Cl.
CPC ............. *H04B 10/27* (2013.01); *H04L 45/12* (2013.01); *H04L 45/125* (2013.01); *H04L 45/22* (2013.01); *H04L 45/42* (2013.01); *H04L 45/62* (2013.01)

(58) Field of Classification Search
CPC ................. H04Q 11/0062; H04L 29/08738; H04L 12/5689
See application file for complete search history.

(56) References Cited

U.S. PATENT DOCUMENTS

| 6,351,465 | B1 * | 2/2002 | Han .......................... 370/395.43 |
| 7,209,434 | B2 * | 4/2007 | Kano et al. ..................... 370/216 |
| 2002/0089712 | A1 * | 7/2002 | Kang et al. ..................... 359/110 |

(Continued)

FOREIGN PATENT DOCUMENTS

WO    2012/110108 A1    8/2012

OTHER PUBLICATIONS

PCT International Search Report and Written Opinion, PCT Application PCT/US2014/014282, ISA/EP, European Patent Office, Netherlands, mailed Jul. 4, 2014 (eleven pages).

(Continued)

*Primary Examiner* — Shi K Li
*Assistant Examiner* — Mina Shalaby
(74) *Attorney, Agent, or Firm* — The Law Office of Kirk D. Williams (57) ABSTRACT

In one embodiment, a replacement network communications path is determined using dedicated resources of an existing path. One or more network elements in a network determines a new communications path between a first network node and a second network node in the network while an existing communications path is currently configured in the network to carry traffic between the first and second network nodes. The existing communications path includes one or more exclusive physical resources dedicated to the existing communications path. The new communications path includes at least one of said exclusive physical resources dedicated to the existing communications path. One embodiment includes: subsequent to said determining the new communications path, removing the existing communications path from service, and then instantiating the new communications path, with the new communications path including said at least one of said exclusive physical resources.

20 Claims, 6 Drawing Sheets

(56) References Cited

U.S. PATENT DOCUMENTS

| | | | |
|---|---|---|---|
| 2005/0237950 A1* | 10/2005 | Yuan et al. | 370/255 |
| 2008/0101418 A1 | 5/2008 | Vasseur | |
| 2008/0198755 A1 | 8/2008 | Vasseur et al. | |
| 2011/0142450 A1* | 6/2011 | Tanzi et al. | 398/79 |
| 2013/0077478 A1* | 3/2013 | Matsuura | 370/225 |

OTHER PUBLICATIONS

Lang et al., "RSVP-TE Extensions in support of End-to-End Generalized Multi-Protocol Label Switching (GMPLS) Recovery," draft-ietf-ccamp-gmpls-recovery-e2e-signaling-04.txt, Oct. 2006, The Internet Society, Reston, VA, USA (forty-three pages).

Awduche et al., "RSVP-TE: Extensions to RSVP for LSP Tunnels," RFC 3209, Dec. 2001, The Internet Society, Reston, VA, USA (sixty-one pages).

Papadimitriou et al., "Generalized MPLS (GMPLS) Protocol Extensions for Multi-Layer and Multi-Region Networks (MLN/MRN)," RFC 6001, Oct. 2010, The Internet Society, Reston, VA, USA (twenty-four pages).

Lang et al., "RSVP-TE Extensions in Support of End-to-End Generalized Multi-Protocol Label Switching (GMPLS) Recovery," RFC 4872, May 2007, The Internet Society, Reston, VA, USA (forty-seven pages).

\* cited by examiner

FIGURE 4

REPLACING AN EXISTING NETWORK COMMUNICATIONS PATH WITH A NEW PATH USING SOME EXCLUSIVE PHYSICAL RESOURCES OF THE EXISTING PATH

TECHNICAL FIELD

The present disclosure relates generally to communicating information, such as in packets, in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably and efficiently communicating information in a network is important. Different techniques may be employed in a network to communicate information in a network when the topology of the network changes and/or when communications resources become available.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with replacing an existing network communications path with a new path using some exclusive physical resources of the existing path. These exclusive physical resources are dedicated to the existing network communications path, and cannot be simultaneously used by another communications path. One embodiment includes determining, by one or more network elements in a network, a new communications path between a first network node and a second network node in the network while an existing communications path is currently configured in the network to carry traffic between the first and second network nodes. The existing communications path is defined to span inclusively between a network interface of the first network node and a network interface of the second network node, with the existing communications path including one or more exclusive physical resources dedicated to the existing communications path. The new communications path includes at least one of said exclusive physical resources dedicated to the existing communications path. One embodiment includes: subsequent to said determining the new communications path, removing the existing communications path from service, and then instantiating the new communications path, with the new communications path including said at least one of said exclusive physical resources.

2. Description

Disclosed are, inter alia, methods, apparatus, computer-storage media, mechanisms, and means associated with replacing an existing network communications path with a new path using some exclusive physical resources of the existing path. These exclusive physical resources are dedicated to the existing network communications path, and cannot be simultaneously used by another communications path. In prior systems, these exclusive resources would not be available for use in determining a new communications path as they are currently in use.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with replacing an existing network communications path with a new path using some exclusive physical resources of the existing path. One embodiment includes a method, comprising: determining, by one or more network elements in a network, a new communications path between a first network node and a second network node in the network while an existing communications path is currently configured in the network to carry traffic between the first and second network nodes, wherein the existing communications path is defined to span inclusively between a network interface of the first network node and a network interface of the second network node, with the existing communications path including one or more exclusive physical resources dedicated to the existing communications path, and wherein the new communications path includes at least one of said exclusive physical resources dedicated to the existing communications path.

One embodiment includes: subsequent to said determining the new communications path, removing the existing communications path from service, and then instantiating the new communications path. In one embodiment, each of the first and second network nodes are packet switching devices configured to switch Internet Protocol (IP) or Layer 2 packets; wherein each of the network interface of the first network node and the network interface of the second network node are optical interfaces configured for optically communicating over the existing communications path, and wherein the method includes: sending and receiving optically-framed IP or Layer 2 packets to and from the existing communications path prior to said removing the existing communications path from service; and sending and receiving optically-framed IP or Layer 2 packets to and from the new communications path after said instantiating the new communications path.

In one embodiment, the new communications path includes a plurality of exclusive optical physical resources; and wherein the determining the new communications path includes progressively signaling through a plurality of optical nodes in the network communicatively between the first and second network nodes and locking optical physical resources, including the plurality of exclusive optical physical resources, to be used by the new communications path. In one embodiment, at least two of the plurality of exclusive optical physical resources are used by the existing communications path.

In one embodiment, each of the first and second network nodes are packet switching devices configured to switch Internet Protocol (IP) or Layer 2 packets; wherein each of the network interface of the first network node and the network interface of the second network node are optical interfaces configured for optically communicating over the existing communications path; wherein both the existing communications path and the new communications path are optical paths.

In one embodiment, the network includes a third communications path between the first network node and the second network node for communicating IP or Layer 2 packets; and wherein the method includes: subsequent to said determining the new communications path, configuring the first network node from communicating packet traffic over the existing communications path to communicating packet traffic over the third communications path; then removing the existing communications path from service; then instantiating the new communications path, with the new communications path including said at least one of said exclusive physical resources; and then configuring the first network node from communicating packet traffic over the third communications path to communicating packet traffic over the new communications path.

One embodiment includes: in response to determining that the new communications path has quantitative characteristics better than quantitative characteristics of the existing communications path, removing the existing communications path from service and instantiating the new communications path, with the new communications path including said at least one of said exclusive physical resources.

In one embodiment, said determining the new communications path includes locking a plurality of physical resources for use in instantiating the new communications path; and wherein the method includes: in response to determining that the new communications path does not have quantitative characteristics that are sufficiently better than quantitative characteristics of the existing communications path, albeit having said quantitative characteristics better than said quantitative characteristics of the existing communications path, releasing said locking for the plurality of resources.

In one embodiment, the new communications path includes a plurality of exclusive physical resources; and wherein the determining the new communications path includes progressively signaling through a plurality of network nodes in the network communicatively between the first and second network nodes and locking physical resources, including the plurality of exclusive physical resources, to be used by the new communications path.

In one embodiment, the new communications path spans inclusively between the network interface of the first network node and the network interface of the second network node. In one embodiment, the network interface of the first network node and the network interface of the second network node are both optical interfaces for communicating with the network. In one embodiment, the new communications path and the existing communications path use a different optical wavelength for sending optical frames from the network interface of the first network node. In one embodiment, the new communications path and the existing communications path use a same optical wavelength for sending optical frames from the network interface of the first network node.

In one embodiment, said one or more exclusive physical resources include an optical wavelength of an optical fiber spanning between two optical nodes in the network; wherein said two optical nodes are between the first and second network nodes in the network along both the existing communications path and the new communications path.

One embodiment includes a method, comprising: receiving, by a first optical device in an optical network from a first packet switching device, a new path request signaling to determine a new communications path between the first packet switching device and a second packet switching device through the optical network; wherein the first packet switching device and the second packet switching device are already communicatively coupled via an existing communications path through the optical network, with the existing communications path using a plurality of exclusive optical physical resources; and determining, by the first optical device, the new communications path based on resources available in the optical network, with said resources available including the plurality of exclusive optical physical resources currently used by the existing communications path; wherein the new communications path uses two or more of the plurality of exclusive optical physical resources.

One embodiment includes: while the existing communications path is still instantiated in the data plane of the optical network, propagating a path message through a plurality of optical devices to the last optical device along the new communications path, with the path message signaling to lock in the optical control plane corresponding optical resources but not instantiating their use in the optical data plane, with the corresponding optical devices locking the corresponding optical resources but not instantiating their use in the optical data plane. One embodiment includes: sending, in response to receiving the path message by the last optical device, to the first optical device a reservation message for the new communications path; and receiving, by the first optical node, the reservation message, with the reservation message including evaluation metrics about the new communications path.

One embodiment includes: while the existing communications path is still instantiated in the data plane of the optical network, propagating a path message through a plurality of optical devices to the last optical device along the new communications path, with the path message signaling information concerning the new communications path; sending, in response to receiving the path message by the last optical device, to the first optical device a reservation message for the new communications path; and receiving, by the first optical node, the reservation message, with the reservation message including evaluation metrics about the new communications path.

One embodiment includes an optical device, comprising: one or more processing elements; memory; and a plurality of optical interfaces configured to send and receive optical frames; wherein said one or more processing elements are configured to perform operations, including: determining a new communications path between a first packet switching device and a second packet switching device through an optical network, wherein the first packet switching device and the second packet switching device are already communicatively coupled via an existing communications path through the optical network, with the existing communications path using a plurality of exclusive optical physical resources; wherein said determining the new communications path includes considering for use resources available in the optical network, with said resources available including the plurality of exclusive optical physical resources currently used by the existing communications path.

Figure 1A:
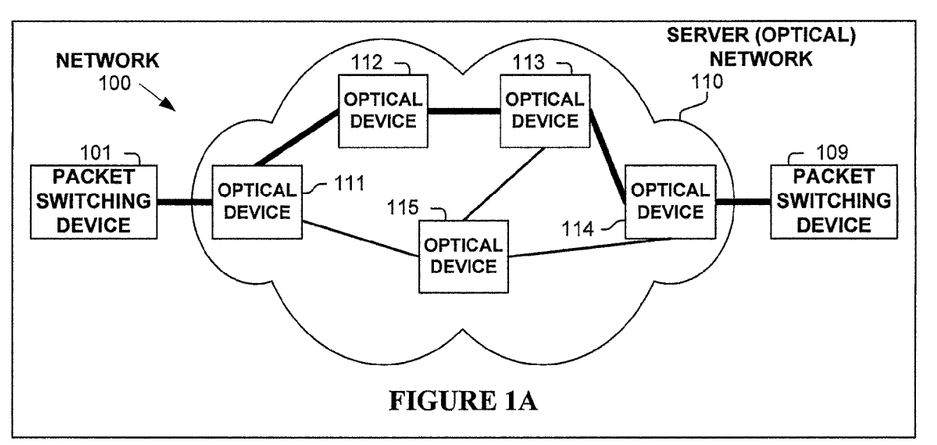
FIGS. 1A-D illustrate a network operating according to one embodiment.

Expressly turning to the figures, FIG. 1A illustrates a network operating according to one embodiment. Illustrated is a network 100, including a client network (e.g., Internet Protocol, Layer-2 switched) including packet switching devices (e.g., network nodes) 101 and 109, and a server network (e.g., optical) 110. Server network 110 provides communications services (e.g., end-to-end paths through network 110 between client packet switching devices 101 and 109).

As shown, server network 110 includes optical devices (e.g., network elements) 111-115. An existing communications path spans between client network packet switching devices 101 and 109, with this existing communications path traversing optical devices 111, 112, 113 and 114. Packet switching devices 101 and 109 communicate their Internet Protocol (IP) and/or Layer-2 packets with each other over this existing communications path in optical frames transmitted and received on their respective optical interface.

A communications path uses physical resources which are dedicated to it. The dedicated resources cannot be used by another communications path. For example, a bi-directional optical communications path uses dedicated optical interfaces and wavelengths on optical fibers, and typically also optical regenerators, optical transponders, and/or resources in optical switches, etc.

When configured, the existing communications path is typically a best path available at the time. However, over time especially if new server network 110 resources become available, there may be a "better" new communications path through server network 110 between packet switching devices 101 and 109. As this new path is going to replace the existing path, physical resources dedicated to the existing path can be considered in determining the new communications path. Typically, one or more same dedicated resources will be used in both the existing and new communications paths. These same physical resources may include, but are not limited to, an optical wavelength of a fiber including that between a client device 101 (or 109) and a server network element 111 (or 114) or between two server network devices 111-115; optical equipment in the network; and/or optical devices 111-115.

In one embodiment, it is desirable to see if there is a "better" path in network 100, and in particular within server (optical network) 110, than existing communications path spanning between client network packet switching devices 101 to 109 which could be used to replace this existing communications path. Such a determination could be made by any device in network 100 that has the requisite information, or could be made in a distributed fashion by multiple devices in network 100. In one embodiment, server network 110 (which can be an optical network or some other network that provides communications services to the client devices, such as packet switching devices 101 and 109) includes devices 111-115 which communicate/flood topology and/or routing information with each other (e.g., using an interior gateway protocol) so any of devices 111-115 could make this determination. In one embodiment, the edge device 111 or 114 (e.g., the device directly connected to a client device 101 or 109) makes the determination.

In one embodiment, there is an existing communications path spanning between client network packet switching devices 101 to 109, with this existing communications path traversing optical devices 111, 112, 113 and 114 as shown in FIG. 1A. One or more new paths are determined with the resulting paths illustrated in FIGS. 1B-1D, including showing some of the physical resources of the existing path that may be used by a new communications path.

Figure 1B:
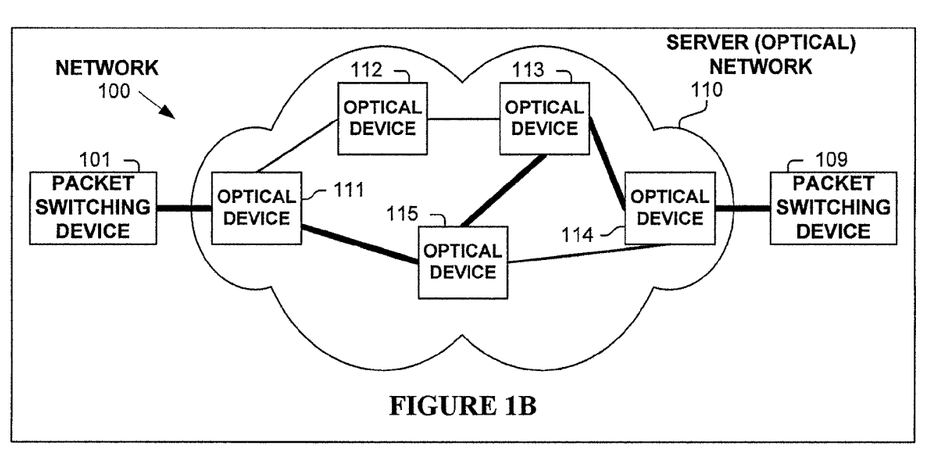

FIG. 1B illustrates a new communications path inclusively between optical interfaces of packet switching devices 101 and 109, and traversing optical devices 111, 115, 113, and 114. FIG. 1B illustrates the sharing of the same physical resources used by the existing communications path illustrated in FIG. 1A. Examples of such exclusive physical resources include, but are not limited to, optical interfaces of packet switching devices 101 and 109; transmitting and receiving wavelengths of fibers between devices 101 and 111, 113 and 114, and 114 and 109, and possibly optical elements (e.g., regenerators, cross-connects, etc.) along these fiber paths.

Figure 1C:
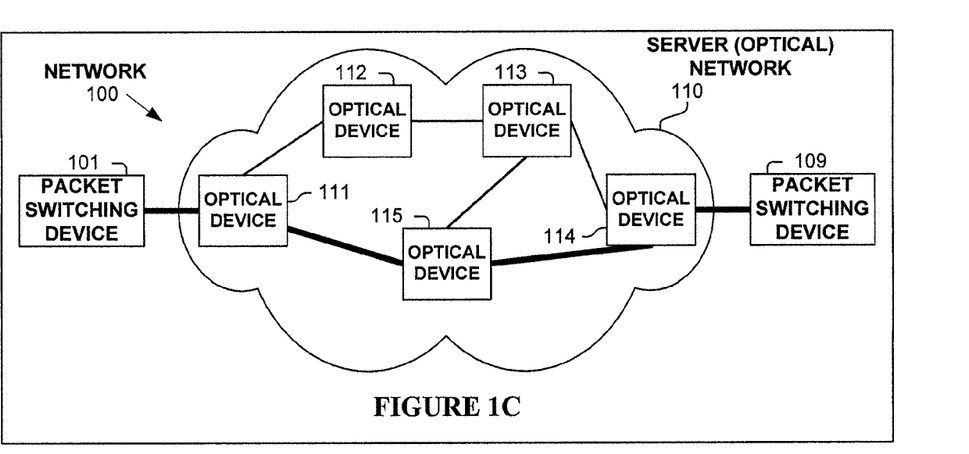

FIG. 1C illustrates a new communications path inclusively between optical interfaces of packet switching devices 101 and 109, and traversing optical devices 111, 115, and 114. FIG. 1C illustrates the sharing of the same physical resources used by the existing communications path illustrated in FIG. 1A. Examples of such exclusive physical resources include, but are not limited to, optical interfaces of packet switching devices 101 and 109; transmitting and receiving wavelengths of fibers between devices 101 and 111, and 114 and 109, and possibly optical elements (e.g., regenerators, cross-connects, etc.) along these fiber paths.

Figure 1D:
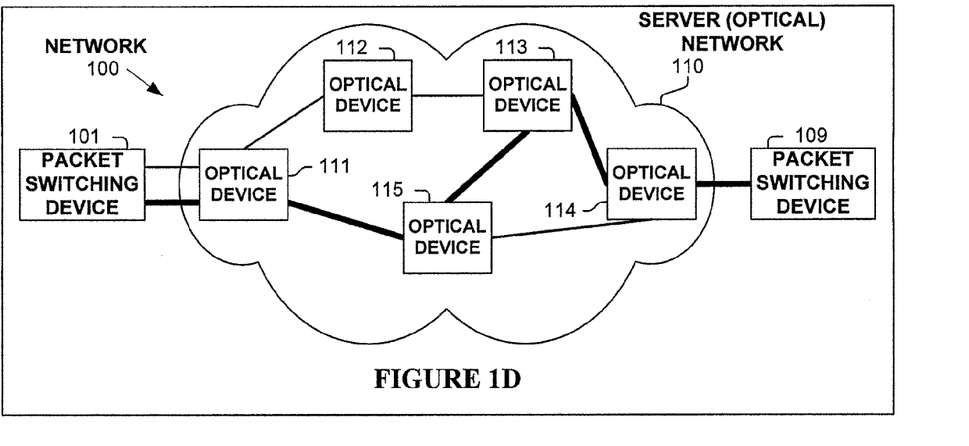

FIG. 1D illustrates a new communications path inclusively between optical interfaces of packet switching devices 101 and 109, and traversing optical devices 111, 115, and 114. FIG. 1D illustrates the sharing of the same physical resources used by the existing communications path illustrated in FIG. 1A. Examples of such exclusive physical resources include, but are not limited to, a transmitting and receiving optical interface of packet switching device 109; transmitting and receiving wavelengths of fibers between devices 113 and 114, and possibly optical elements (e.g., regenerators, cross-connects, etc.) along these fiber paths.

Figure 2:
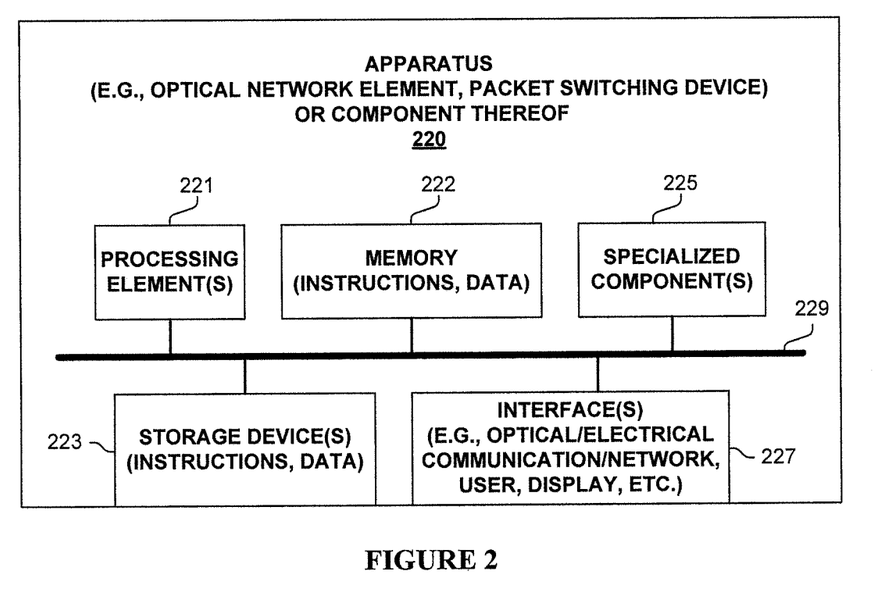
FIG. 2 illustrates an apparatus according to one embodiment.

FIG. 2 is a block diagram of an apparatus 220 (e.g., network element or node, such as a packet switching device or optical device) used in one embodiment associated with replacing an existing network communications path with a new path using some exclusive physical resources of the existing path. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and optical and/or electrical interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3A:
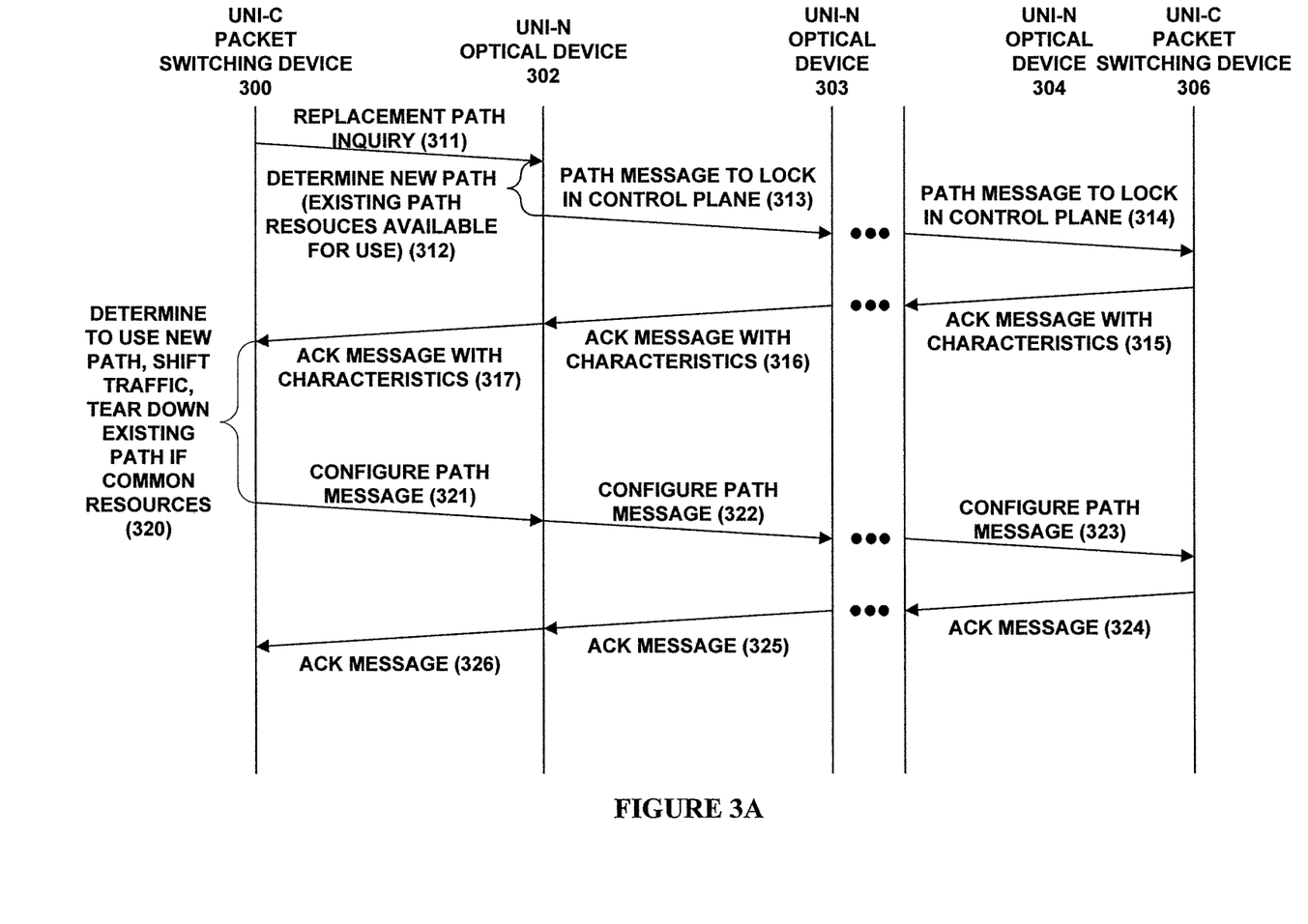
FIG. 3A illustrates communication and processing by network nodes and elements according to one embodiment.

FIG. 3A illustrates communication and processing by client network nodes and server network elements according to one embodiment. Illustrated are client packet switching devices 300 and 306, and multiple server network elements/optical devices 302-304. Packet switching devices 300 and 306 communicate with the server network using a User Network Interface-Client (UNI-C), while optical devices communicate with each other using a User Network Interface-Network (UNI-N).

In one embodiment, an existing communications link spans between packet switching devices 300 and 306, including traversing optical device 302. In response to some trigger (e.g., operator input, time of day/week/month, periodically), packet switching device 300 sends a replacement path inquiry message (311) to optical device 302. Optical device 302 determines (312) a new path through optical devices 303 to 304 (which could include additional optical devices indicated by the dots) in optical (e.g., server) network to packet switching device 306. In making this determination, physical resources of the optical network being exclusively used by the existing communications path as well as other available resources are considered.

In one embodiment, after determining the new communications path, messages are sent along this path (313, 314) to lock in the control plane (but not instantiate in the data plane) the needed resources as well to determine characteristics (e.g., latency/length of optical path, shared risk link group "SRLG" information, transponder/regenerator cost information, congested links) of the new communications path. In one embodiment, the messages sent along the path (313, 314) include a Pre-Planned Label Switched Path (LSP) flag indicating to lock resources. Acknowledgement messages, including characteristics of the new path, are returned along the path (315, 316, 317) to packet switching device 300. If there is a problem, negative acknowledgement message(s) would be sent.

Packet switching device 300 then makes a determination (320) of whether or not to replace the existing communications path with the new communications path. Typically, this determination is based on whether the new communications path is "better" (e.g., based on an evaluation of the returned characteristics). In one embodiment, even if the new communications path is considered better, it might better by an amount that justifies the work/cost/traffic disruption of switching traffic from the existing to new communication path. In one embodiment, if the determination is not to replace the existing with the new communications path, messages are propagated to release the locked physical resources, or these locks are left to time out. In one embodiment, edge optical device 302 (or another device) makes the determination whether switching traffic from the existing to the new communications path is justified.

In response to determining to replace the existing with the new communications path (320), configure path messages (321-323) are propagated between packet switching devices 300 and 306 through optical devices (302-304) to configure the new path, with acknowledgement messages (324-326) returned. (If there is a problem, negative acknowledgement message(s) would be sent.) The new communications path is instantiated in both the control and data planes of the network, so packet switching devices 300 and 306 can now communicate over the new communications path.

In one embodiment prior to instantiating the new communications path, client packet traffic, or at least high-priority traffic, is rerouted at the client network layer to avoid the existing communications path as the instantiation (e.g. provisioning) of the new communications path is typically disruptive of the existing communications path as one or more exclusive physical resources are common to both paths. Hence, these common one or more exclusive physical resources cannot be simultaneously used by the existing communications path while the new communications path is being instantiated.

Figure 3B:
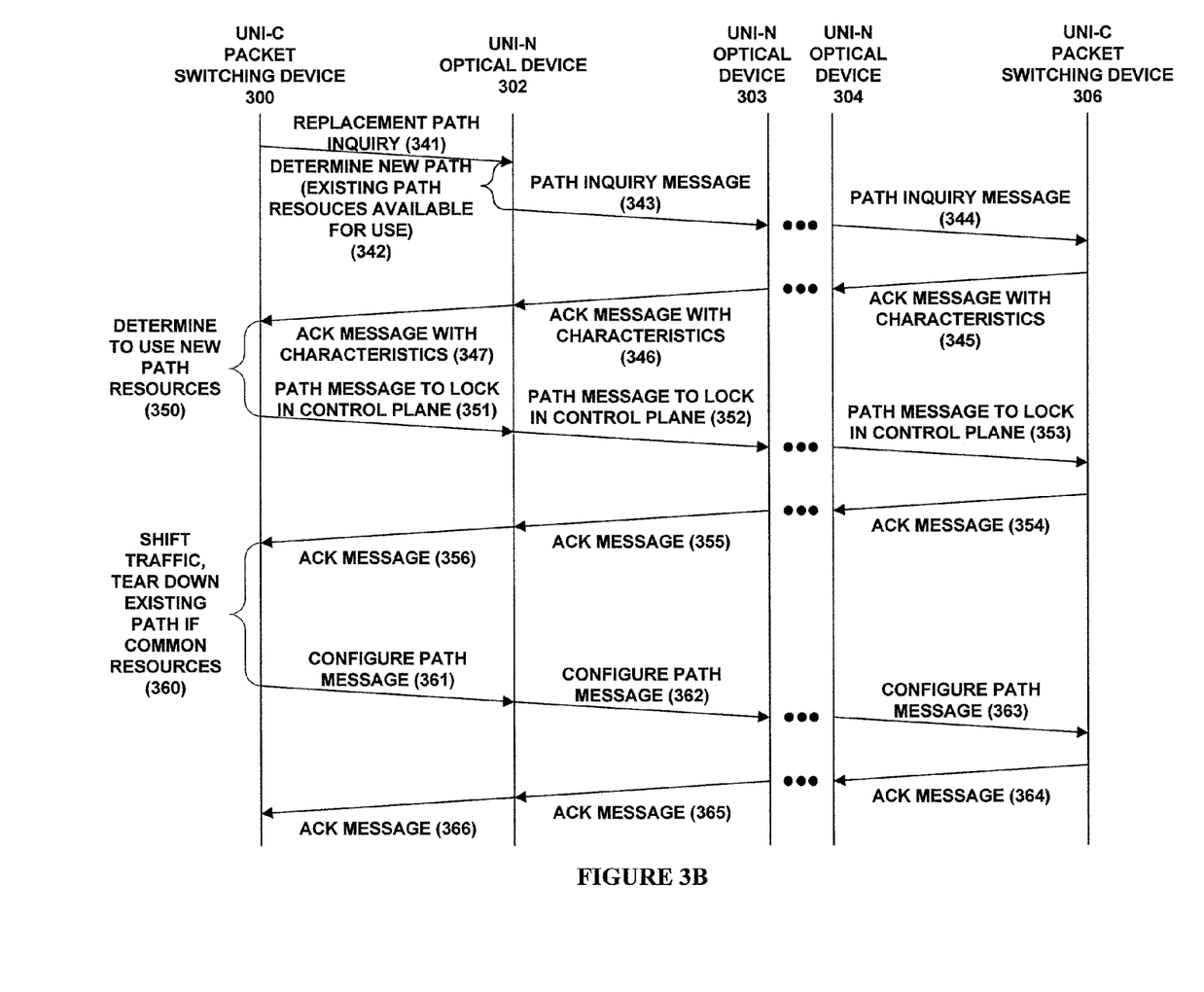
FIG. 3B illustrates communication and processing by network nodes and elements according to one embodiment.

In one embodiment such as that illustrated by FIG. 3B, locking of resources is not performed until the determination has been made to switch to the new communications path. This technique is also preferable if it is simply desirable to determine a best available path for replacing the existing communications path without intending to switch paths at the present time.

The operation of one embodiment illustrated in FIG. 3B is similar to that of FIG. 3A, but first a phase of determining the new communications path and its characteristics, as well as making the decision to switch communications path, is performed prior to locking of resources.

In one embodiment, an existing communications link spans between packet switching devices 300 and 306, including traversing optical device 302. In response to some trigger (e.g., operator input, time of day/week/month, periodically), packet switching device 300 sends a replacement path inquiry message (341) to optical device 302. Optical device 302 determines (342) a new path through optical devices 303 to 304 (which could include additional optical devices indicated by the dots) in optical (e.g., server) network to packet switching device 306. In making this determination, physical resources of the optical network being exclusively used by the existing communications path as well as other available resources are considered.

In one embodiment, after determining the new communications path, path inquiry messages are sent along this path (343, 344) in order to determine characteristics (e.g., latency/length of optical path, shared risk link group "SRLG" information, transponder/regenerator cost information, congested links) of the new communications path. In one embodiment, the messages sent along the path (343, 344) include a Pre-Planned Label Switched Path (LSP) flag indicating not to lock resources Acknowledgement messages, including characteristics of the new path, are returned along the path (345, 346, 347) to packet switching device 300. If there is a problem, negative acknowledgement message(s) would be sent.

Packet switching device 300 then makes a determination (350) of whether or not to replace the existing communications path with the new communications path. Typically, this determination is based on whether the new communications path is "better" (e.g., based on an evaluation of the returned characteristics). In one embodiment, even if the new communications path is considered better, it might not be better by an amount that justifies the work/cost/traffic disruption of switching traffic from the existing to new communication path. In one embodiment, edge optical device 302 (or another device) makes the determination whether switching traffic from the existing to the new communications path is justified.

In response to determining to replace the existing with the new communications path (350), messages are sent along this path (351, 352, 353) to lock in the control plane (but not instantiate in the data plane) the needed resources. In one embodiment, the messages sent along the path (352, 353) include a Pre-Planned Label Switched Path (LSP) flag indicating to lock resources. Acknowledgement messages, possibly including characteristics of the new path, are returned along the path (354, 355, 356) to packet switching device 300. If there is a problem, negative acknowledgement message(s) would be sent.

In one embodiment, client packet traffic, or at least high-priority traffic, is rerouted (360) at the client network layer to avoid the existing communications path as the instantiation (e.g. provisioning) of the new communications path is typically disruptive of the existing communications path as one or more exclusive physical resources are common to both paths. Hence, these common one or more exclusive physical resources cannot be simultaneously used by the existing communications path while the new communications path is being instantiated.

Next, configure path messages (361-363) are propagated between packet switching devices 300 and 306 through optical devices (302-304) to configure the new path, with acknowledgement messages (364-366) returned. (If there is a problem, negative acknowledgement message(s) would be sent.) The new communications path is instantiated in both the control and data planes of the network, so packet switching devices 300 and 306 can now communicate over the new communications path.

Figure 4:
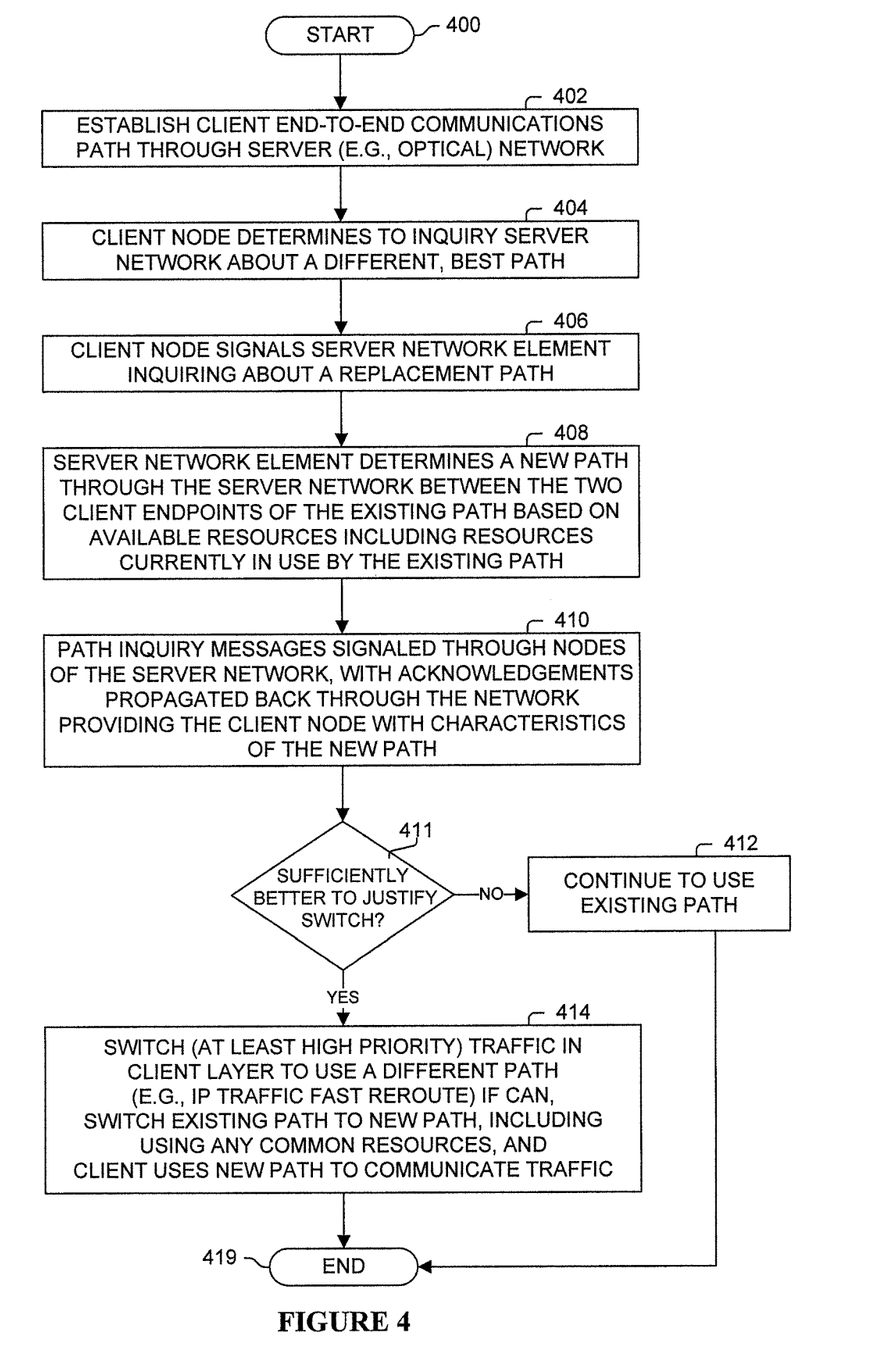
FIG. 4 illustrates a process according to one embodiment.

FIG. 4 illustrates a process performed in one embodiment. Processing begins with process block 400. In process block 402, the "existing" communications path is established through a server network (e.g., optical network) between two client nodes (e.g., packet switching devices). In process block 404, the client node determines (e.g., in response to operator input, time of day/week/month, periodically) to inquire about a replacement best path. In process block 406, the client node signals a server network element to inquire about a best new communications path to replace the existing communications path.

In process block 408, the server network element determines a best path, the new communications path, through the server network to replace the existing communications path. This determination is made based on available resources, including exclusive physical resources currently in use by the existing communications path. In process block 410, path inquiry messages are signaled along the new communications path through the server network to the other client node, with acknowledgements propagated back through the network providing the client node with characteristics of the new path. In one embodiment, resources that would be used by the new communications path are locked in the control plane of the server network, but not instantiated in the data plane of the server network.

A determination is made in process block 411, typically by the client node (or possibly by a server network element such as an optical device or management system), as to whether the new communications path is sufficiently better than the existing communications path to justify the tearing down of the existing communications path and instantiating the new communications path. In one embodiment, a determination is simply a strict evaluation of whether the new communications path is better (e.g., has better qualitative characteristics) than the old communications path. In one embodiment, this determination is whether the new communications path is better by some delta or threshold measurable amount (in other words "sufficiently better") than the old communications path (e.g., the new communications path may be strictly better, but not better by the requisite threshold amount, so no switching will be performed). This threshold amount may be a small value better, one or more orders of magnitude better, or any commiserate amount that justifies the switching between communications path, when a lesser value does to justify the overhead and/or effect on traffic during switching communications paths.

When the determination made in process block 411 is not to switch, then in process block 412, the client nodes continue to use the existing communications path (and possibly locked resources in the server network are released). When the determination made in process block 411 is to switch, then in process block 414 in one embodiment, the client node moves at least high priority traffic away from using the existing communications path in the client layer to use a different path (e.g., using IP fast reroute). The existing communications path is removed from service and the new communications path is instantiated in the data plane, typically using one or more exclusive physical resources that were previously used by the existing communications path. The client nodes then can communicate with each other over the new communications path. Processing of the flow diagram of FIG. 4 is complete as indicated by process block 419.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    determining, by one or more network elements in a server network in response to a replacement path inquiry by a first client packet switching device, a new communications path between a first network node and a second network node in the server network while an existing communications path is currently configured in the server network to carry traffic between the first and second network nodes, with the first client packet switching device external to the server network and directly coupled to the first network node, with a second client packet switching device external to the server network and directly coupled to the second network node, such that the server network communicatively couples the first client packet switching device to the second client packet switching device over the existing communications path over which packet traffic is currently carried; and,
    sending a new path acknowledgement message including one or more characteristics of the new communications path by the first network node to the first packet switching device; and
    configuring the new communications path communicatively coupling the first client packet switching device to the second client packet switching device through the server network by the server network in response to a configure path request by the first client packet switching device received subsequent to said sending the new path acknowledgement message;
    wherein the existing communications path is defined to span within the server network inclusively between a network interface of the first network node and a network interface of the second network node, with the existing communications path within the server network including one or more exclusive physical resources dedicated to the existing communications path, and
    wherein the new communications path includes at least one of said exclusive physical resources dedicated to the existing communications path; and
    wherein by definition, an exclusive physical resource at any given time is exclusively used by a single communications path through the server network, including said at least one of said exclusive physical resources dedicated to the existing communications path not being simultaneously used by the existing communications path when said configuring the new communications path.

2. The method of claim 1, comprising: subsequent to said determining the new communications path, removing the existing communications path from service, and then said configuring the new communications path.

3. The method of claim 2, wherein each of the first and second network nodes are packet switching devices configured to switch Internet Protocol (IP) or Layer 2 packets;
    wherein each of the network interface of the first network node and the network interface of the second network node are optical interfaces configured for optically communicating over the existing communications path, and
    wherein the method includes: sending and receiving optically-framed IP or Layer 2 packets to and from the existing communications path prior to said removing the existing communications path from service; and sending and receiving optically-framed IP or Layer 2 packets to and from the new communications path after said configuring the new communications path.

4. The method of claim 2, wherein the new communications path includes a plurality of exclusive optical physical resources; and wherein the determining the new communications path includes progressively signaling through a plurality of optical nodes in the server network communicatively between the first and second network nodes and locking optical physical resources, including the plurality of exclusive optical physical resources, to be used by the new communications path.

5. The method of claim 4, wherein at least two of the plurality of exclusive optical physical resources are used by the existing communications path.

6. The method of claim 1, wherein each of the first and second network nodes are packet switching devices configured to switch Internet Protocol (IP) or Layer 2 packets; wherein each of the network interface of the first network node and the network interface of the second network node are optical interfaces configured for optically communicating over the existing communications path; wherein both the existing communications path and the new communications path are optical paths.

7. The method of claim 1, wherein the server network includes a third communications path between the first network node and the second network node for communicating IP or Layer 2 packets; and
    wherein the method includes: subsequent to said determining the new communications path, configuring the first network node from communicating packet traffic over the existing communications path to communicating packet traffic over the third communications path; then removing the existing communications path from service; then said configuring the new communications path, with the new communications path including said at least one of said exclusive physical resources; and then configuring the first network node from communicating packet traffic over the third communications path to communicating packet traffic over the new communications path.

8. The method of claim 1, comprising: in response to determining that the new communications path has quantitative characteristics better than quantitative characteristics of the existing communications path, removing the existing communications path from service and said configuring the new communications path, with the new communications path including said at least one of said exclusive physical resources.

9. The method of claim 1, wherein said determining the new communications path includes locking a plurality of physical resources for use in said configuring the new communications path; and
wherein the method includes: in response to determining that the new communications path does not have quantitative characteristics that are sufficiently better than quantitative characteristics of the existing communications path, albeit having said quantitative characteristics better than said quantitative characteristics of the existing communications path, releasing said locking for the plurality of resources.

10. The method of claim 1, wherein the new communications path includes a plurality of exclusive physical resources; and wherein the determining the new communications path includes progressively signaling through a plurality of network nodes in the server network communicatively between the first and second network nodes and locking physical resources, including the plurality of exclusive physical resources, to be used by the new communications path.

11. The method of claim 1, wherein the new communications path spans inclusively between the network interface of the first network node and the network interface of the second network node.

12. The method of claim 11, wherein the network interface of the first network node and the network interface of the second network node are both optical interfaces for communicating with the server network.

13. The method of claim 12, wherein the new communications path and the existing communications path use a different optical wavelength for sending optical frames from the network interface of the first network node.

14. The method of claim 12, wherein the new communications path and the existing communications path use a same optical wavelength for sending optical frames from the network interface of the first network node.

15. The method of claim 1, wherein said one or more exclusive physical resources include an optical wavelength of an optical fiber spanning between two optical nodes in the server network; wherein said two optical nodes are between the first and second network nodes in the server network along both the existing communications path and the new communications path.

16. A method, comprising:
receiving, by a first optical device in an optical network from a first packet switching device external to the optical network, a new path request signaling to determine a new communications path between the first packet switching device and a second packet switching device through the optical network with the second packet switching device being external to the optical network; wherein the first packet switching device and the second packet switching device are already communicatively coupled via an existing communications path through the optical network, with the existing communications path using a plurality of exclusive optical physical resources;
determining, by the first optical device in response to the new path request signaling, the new communications path based on resources available in the optical network, with said resources available including the plurality of exclusive optical physical resources currently used by the existing communications path;
sending, by the first optical device to the first packet switching device, a new path acknowledgement message including one or more characteristics of the new communications path; and
configuring the new communications path by the optical network in response to a configure path message received from the first packet switching device subsequent to said sending of the new path acknowledgement message;
wherein the new communications path uses two or more of the plurality of exclusive optical physical resources; and
wherein by definition, an exclusive physical resource at any given time is exclusively used by a single communications path through the optical network, including said two or more of the plurality of exclusive optical physical resources dedicated to the existing communications path not being simultaneously by the existing communications path when configuring the new communications path.

17. The method of claim 16, comprising: while the existing communications path is still configured in optical data plane of the optical network, propagating a path message through a plurality of optical devices to the last optical device along the new communications path, with the path message signaling to lock in the optical control plane corresponding optical resources but not configuring their use in the optical data plane, with the corresponding optical devices locking the corresponding optical resources but not configuring their use in the optical data plane.

18. The method of claim 17, comprising: sending, in response to receiving the path message by the last optical device, to the first optical device a reservation message for the new communications path; and
receiving, by the first optical node, the reservation message, with the reservation message including evaluation metrics about the new communications path.

19. The method of claim 16, comprising:
while the existing communications path is still configured in the optical data plane of the optical network, propagating a path message through a plurality of optical devices to the last optical device along the new communications path, with the path message signaling information concerning the new communications path;
sending, in response to receiving the path message by the last optical device, to the first optical device a reservation message for the new communications path; and
receiving, by the first optical node, the reservation message, with the reservation message including evaluation metrics about the new communications path.

20. An optical device, comprising:
one or more processing elements;
memory; and
a plurality of optical interfaces configured to send and receive optical frames;
wherein said one or more processing elements are configured to perform operations, including: determining a new communications path between a first packet switching device and a second packet switching device through an optical network in response to a replacement path inquiry received from the first packet switching device, with both the first packet switching device and the second packet switching device being external to the optical network, wherein the first packet switching device and the second packet switching device are already communicatively coupled via an existing communications path through the optical network, with the existing communications path using a plurality of exclusive optical physical resources; wherein said determining the new communications path includes considering for use resources available in the optical network, with said resources available including the plurality of exclusive optical physical resources currently used by the existing communications path; wherein the new communications path uses two or more of the plurality of exclusive optical physical resources; and wherein said operations include sending to the first packet switching device a new path acknowledgement message including one or more characteristics of the new communications path, and signaling to configure the new communications path in response to a configure path message received from the first packet switching device subsequent to said sending of the new path acknowledgement message;

wherein by definition, an exclusive physical resource at any given time is exclusively used by a single communications path through the optical network, including said two or more of the plurality of exclusive optical physical resources dedicated to the existing communications path not being simultaneously by the existing communications path when configuring the new communications path.

\* \* \* \* \*